(12) United States Patent
Adachi

(10) Patent No.: US 7,864,888 B2
(45) Date of Patent: Jan. 4, 2011

(54) TRANSMISSION MODE/GUARD LENGTH DETECTION CIRCUIT AND METHOD THEREFOR

(75) Inventor: Naoto Adachi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 555 days.

(21) Appl. No.: 11/948,111

(22) Filed: Nov. 30, 2007

(65) Prior Publication Data

US 2008/0152048 A1    Jun. 26, 2008

(30) Foreign Application Priority Data

Dec. 22, 2006    (JP) .............................. 2006-346493

(51) Int. Cl.
*H03K 9/06*    (2006.01)
*H04L 27/06*    (2006.01)
(52) U.S. Cl. ...................................... 375/316; 375/340
(58) Field of Classification Search ......... 375/259–261, 375/267–269, 316, 340, 343, 354–355, 364–366, 375/368; 370/203, 208, 277, 281, 295, 343, 370/436, 478, 480–481, 503, 509, 511–512, 370/514, 517, 520
See application file for complete search history.

(56) References Cited

U.S. PATENT DOCUMENTS 7,319,659 B2 *    1/2008   Tsuie ........................ 370/203

| 7,336,598 | B2 * | 2/2008 | Kakura ........................ 370/208 |
| 7,433,296 | B2 * | 10/2008 | Tsuie ........................ 370/203 |
| 7,474,610 | B2 * | 1/2009 | Yoshida et al. ............... 370/204 |
| 7,587,006 | B2 * | 9/2009 | Taniguchi et al. ........... 375/347 |
| 2002/0186791 | A1 * | 12/2002 | Foxcroft et al. ............. 375/324 |
| 2006/0146947 | A1 * | 7/2006 | Kim ........................... 375/260 |
| 2006/0286948 | A1 * | 12/2006 | Taniguchi et al. ........... 455/140 |
| 2007/0086329 | A1 * | 4/2007 | Glazko et al. ............... 370/208 |
| 2010/0080330 | A1 * | 4/2010 | Kawauchi et al. ........... 375/348 |

FOREIGN PATENT DOCUMENTS

| JP | 10-327122 | 12/1998 |
| JP | 2003-46472 | 2/2003 |
| JP | 2003-264528 | 9/2003 |

* cited by examiner

*Primary Examiner*—Tesfaldet Bocure
*Assistant Examiner*—Lawrence B Williams
(74) *Attorney, Agent, or Firm*—Staas & Halsey LLP

(57) ABSTRACT

A transmission mode/guard length detection circuit that uses the Orthogonal Frequency Division Multiplexing method, in which: a difference between a reference wave having a constant period generated on the basis of a transmission mode length that is a time period length of the predetermined symbol and a guard length that is a time period length of the guard interval and the peak value interval is calculated as a shift amount, and the shift amount is integrated for a symbol and is output, and the result of the integration for a predetermined symbol is changed on the basis of the shift amount.

6 Claims, 10 Drawing Sheets

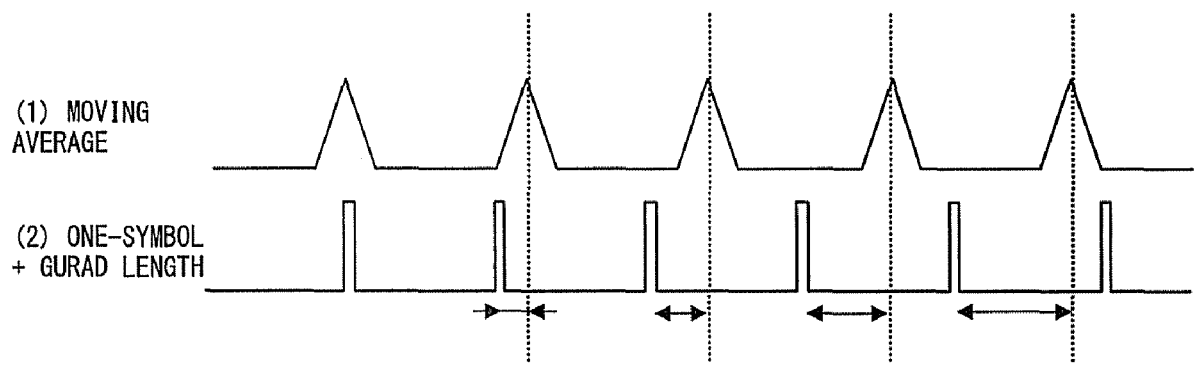
F I G. 8

SHIFT AMOUNT INTEGRAL VALUE

GREAT

SET PEAK MAXIMUM VALUE TO BE INVALID(0) AND USE
THRESHOLD VALUE 1

SET PEAN MAXIMUM VALUE TO B 1/4 OF THE ORIGINAL AND USE
THRESHOLD VALUE 2

SET PEAK MAXIMUM VALUE TO BE 1/2 OF THE ORIGINAL AND USE
THRESHOLD VALUE 3

USE PEAK MAXIMUM VALUE AS IT IS

SMALL

F I G. 9

TRANSMISSION MODE/GUARD LENGTH DETECTION CIRCUIT AND METHOD THEREFOR

CROSS-REFERENCE TO RELATED APPLICATIONS

This application is based upon and claims the benefit of priority from the prior Japanese Patent Application No. 2006-346493 filed on Dec. 22, 2006, the entire contents of which are incorporated herein by reference.

BACKGROUND OF THE INVENTION

1. Field of the Invention

The present invention relates to a transmission method using the Orthogonal Frequency Division Multiplexing (OFDM) method.

2. Description of the Related Art

In recent years, a transmission method called the Orthogonal Frequency Division Multiplexing (OFDM) method has been proposed as a method for transmitting digital signals. In the OFDM method, pieces of data are assigned to a plurality of carrier waves that are orthogonal to one another on the frequency axis, and the modulation and demodulation are performed on the basis of the IFFT and FFT. The OFDM method can realize high efficiency in frequency utilization, and hence the application of the OFDM method to digital terrestrial broadcasting is widely discussed. Also, the OFDM method is employed as one of the standards of the ISDB-T (Integrated Services Digital Broadcasting-Terrestrial) for digital terrestrial broadcasting in Japan.

In a conventional digital modulation method that uses a single carrier wave, the higher the transmission rate, the shorter the symbol period becomes, and accordingly the demodulation of signals has been difficult in multi-path situations (situations in which a wave transmitted from a base station is reflected by obstacles such as buildings or the like, and comes to be received by a reception terminal [such as a mobile phone or a TV receiver] via a plurality of paths). In order to cope with this situation, in the OFDM method, the multi-carrier transmission method is used (information is divided and transmitted on a plurality of carrier waves), and thereby a greater symbol length on one carrier wave is obtained in order to cope with multi-path situations involving great delays. Also, because pieces of data are assigned to a plurality of carrier waves, different modulation method scan be used over such carrier waves.

Also, in the OFDM method, a signal at the end portion of the symbol is added before the symbol, and thereby tolerance against multi-path situations is enhanced. The signal thus added is called a guard interval.

FIG. 1 shows the effect of the guard intervals in the multi-path situations. FIG. 1A shows the case when the guard interval is not used, and FIG. 1B shows the case when the guard intervals are used.

In FIG. 1A, a guard interval is not used, and thus when the FFT process is performed on the symbol "n" in a situation with a delayed wave (a signal wave that arrives delayed after being reflected by objects) in addition to the principal wave (a signal wave that arrives directly), a part of the data of the symbol "n-1" of the delayed wave is involved. This causes interference between the successive symbols, and a deterioration is also caused. In contrast, in the case of FIG. 1B where the guard intervals are used, a part of the data of the symbol "n-1" is not involved when the FFT process is performed on the symbol "n". Thus, the demodulation can be performed without causing the interference.

In the ISDB-T for digital terrestrial broadcasting in Japan, for example, one of three lengths (¼, ⅛, and 1/16 of the symbol length) is assigned to the guard intervals, and these guard intervals are automatically identified.

Also, two standards are employed for the spacing between the carrier waves in the OFDM, i.e., mode 2 that specifies 0.504 ms as the length of one symbol, and mode 3 that specifies 1.008 Bms as the length of one symbol. Also, the guard intervals are added to them. The transmission modes are also automatically identified.

FIG. 2 shows a conventional transmission mode/guard length determination circuit 91. The transmission mode/guard length determination circuit 91 includes a one-symbol delay circuit 92, a correlation calculation circuit 93, a moving average circuit 94, a maximum-value detection circuit 95, a maximum-value integral circuit 96, and a maximum-value comparison circuit 97.

The one-symbol delay circuit 92 delays real data in the principal wave by one symbol (however, the guard intervals are not included).

The correlation calculation circuit 93 correlates the real data in the principal wave and the data delayed by one symbol by the one-symbol delay circuit 92 (not including the guard intervals). The portions of the guard intervals have the same data, and accordingly a high correlation is obtained between them (guard correlation). In other words, when attention is paid to the symbol "n" in FIG. 3, the end portion of the symbol "n" of "(1) principal wave" is correlated with the guard interval Gin of the symbol "n" of (2) the one-symbol delay at the same timing, and it is possible to detect the peak values as shown in "(3) guard correlation". The moving average circuit 94 performs the moving average calculation on the correlation value of the correlation calculation circuit 93 for the guard length. As a result of this, as shown in "(4) moving average" in FIG. 3, peaks are caused at boundary of the guard intervals and the real data.

The maximum-value detection circuit 95 detects a peak value that is the maximum value of signals output from the moving average circuit 94. The maximum-value integral circuit 96 integrates, for several symbols, the peak value from the maximum-value detection circuit 95, and outputs a peak integral value. The maximum-value comparison circuit 97 compares a predetermined threshold value with the peak integral value, and determines a combination of a transmission mode and a guard length on the basis of the comparison result.

Usually, a high peak is not caused unless the magnitude of the peaks are integrated for several symbols and a moving average of the guard correlation is obtained on the basis of the right combination of the transmission mode and the guard length. Accordingly, the results of the combinations of all the transmission modes and guard lengths in the standard are compared among one another, and the combination of the highest transmission mode and guard length is determined to be the right value.

In Patent Documents 1 and 2, a demodulation of OFDM signals is proposed in which transmission modes such as effective symbol lengths and guard intervals are recognized by using the above conventional method.

According to Patent Document 3, a symbol synchronization unit 16 comprises a first detector 401, a second detector 402, and a third detector 403 detecting a reception OFDM signal x(n), a logic AND element 41 performing the AND operation on detected signals v1 (*n*), v2 (*n*), and v3 (*n*) output from the detectors 401 through 403 in order to output a logical signal AV, and a determination circuit 42 generating and outputting a synchronization timing signal T0 by using the logical signal AV. Also, the symbol synchronization unit 16 detects a mode for the reception OFDM signal x(n) from among three modes (modes 1, 2, and 3), and the initial points, the guard interval lengths, and the effective symbol lengths in the respective symbols are automatically detected.

However, when mobile phones or mobile bodies receive data of digital terrestrial broadcasting, fading is frequently caused in which the reception level of radio waves changes due to the movement of the receivers or to elapses of time. In a situation having fading that is too intensive, the electric power itself weakens for a particular time period, and accordingly in this period, the transmission mode and guard length cannot be determined correctly.

Also, when the electric power accidentally weakens for the guard correlation calculation for a target transmission mode and guard length while the transmission mode and guard length are being detected by using a conventional method under the fading situation, another combination comes to have a higher correlation value, and the combination is wrongly selected. When this happens, the wrong transmission mode and guard length are used for the operation and nothing can be received until the fact that the currently used combination is wrong is recognized and the right transmission mode and guard length are detected.

As described above, in fading situations, it takes a longer time to select the right transmission mode and guard length and demodulation processes cannot be performed at all until the right transmission mode and guard length are selected, which is problematic.

Patent Document 1

Japanese Patent Application Publication No. 2003-46472

Patent Document 2

Japanese Patent Application Publication No. 10-327122

Patent Document 3

Japanese Patent Application Publication No. 2003-264528

SUMMARY OF THE INVENTION

According to an aspect of an embodiment, a transmission mode/guard length detection circuit for a radio device using the Orthogonal Frequency Division Multiplexing method includes a one-symbol delay circuit delaying a received principal wave including a guard interval equal to an end portion of a symbol, by real data of the symbol;

a guard correlation circuit calculating a correlation between the principal wave and an output of the one-symbol delay circuit;

a moving average circuit taking a moving average of the outputs of the guard correlation circuit for predetermined symbols;

a maximum value detection circuit detecting a peak value of the output of the moving average circuit for each of the symbols;

a maximum value integral circuit integrating the outputs of the maximum value detection circuit for predetermined symbols;

a guard maximum position shift amount integral circuit calculating a difference between a reference wave having a constant period and a peak value interval of the output of the maximum value detection circuit, said reference wave being generated on the basis of a transmission mode length that is a time period length of the predetermined symbol and a guard length that is a time period length of the guard interval, handling a resultant difference as a shift amount, integrating the shift amount for each of the symbols, and outputting a resultant value; and a maximum value weighting circuit changing the output of the maximum value integral circuit on the basis of the shift amount.

According to an another aspect of an embodiment, a transmission mode/guard length detection method for a radio device using the Orthogonal Frequency Division Multiplexing method includes a one-symbol delay process in which a received principal wave including a guard interval equal to an end portion of a symbol is delayed by real data of the symbol;

a guard correlation process in which a correlation between the principal wave and an output of the one-symbol delay process is calculated;

a moving average process in which a moving average of the outputs of the guard correlation process for predetermined symbols is taken;

a maximum value detection process in which a peak value of the output of the moving average process for each of the symbols is detected;

a maximum value integral process in which the outputs of the maximum value detection process for predetermined symbols are integrated;

a guard maximum position shift amount integral process in which a difference between a reference wave having a constant period and a peak value interval of the output of the maximum value detection process is calculated, said reference wave being generated on the basis of a transmission mode length that is a time period length of the predetermined symbol and a guard length that is a time period length of the guard interval, handling a resultant difference as a shift amount, integrating the shift amount for each of the symbols, and outputting a resultant value; and a maximum value weighting process in which the output of the maximum value integral process is changed on the basis of the shift amount.

BRIEF DESCRIPTION OF THE DRAWINGS

FIG. 8 shows another shift between a shift amount integral value in the wrong transmission mode and guard length and the reference value of the right "one symbol+guard length";

FIG. 9 shows a relationship between shift amount integral values and weighting coefficients.

DESCRIPTION OF THE PREFERRED EMBODIMENTS

Figure 1A:
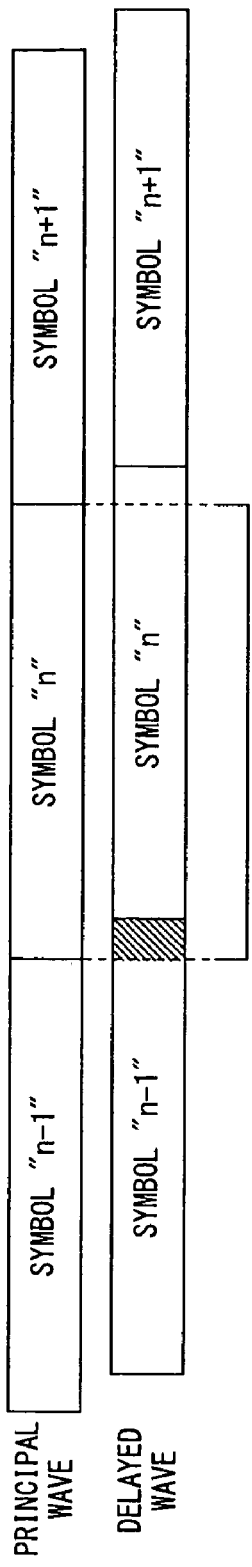
FIG. 1A shows the cases without guard intervals.
Figure 1B:
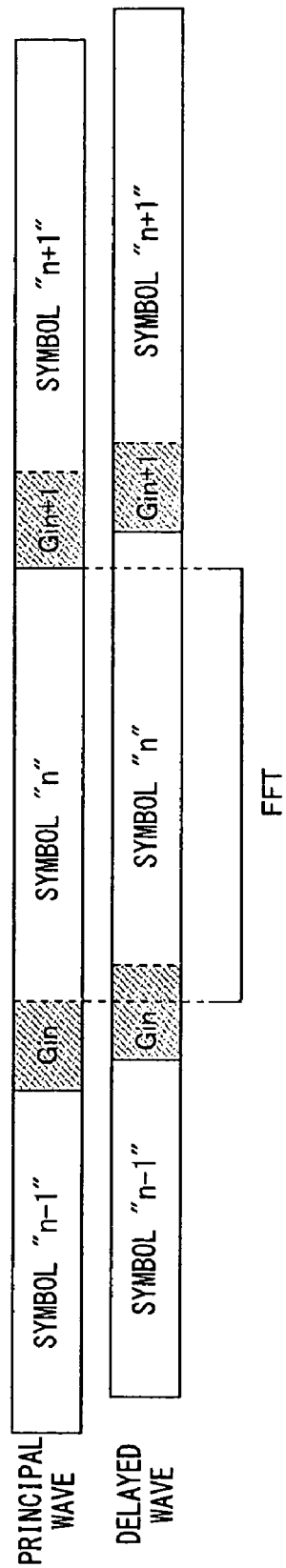
FIG. 1B shows the cases with guard intervals.
Figure 2:
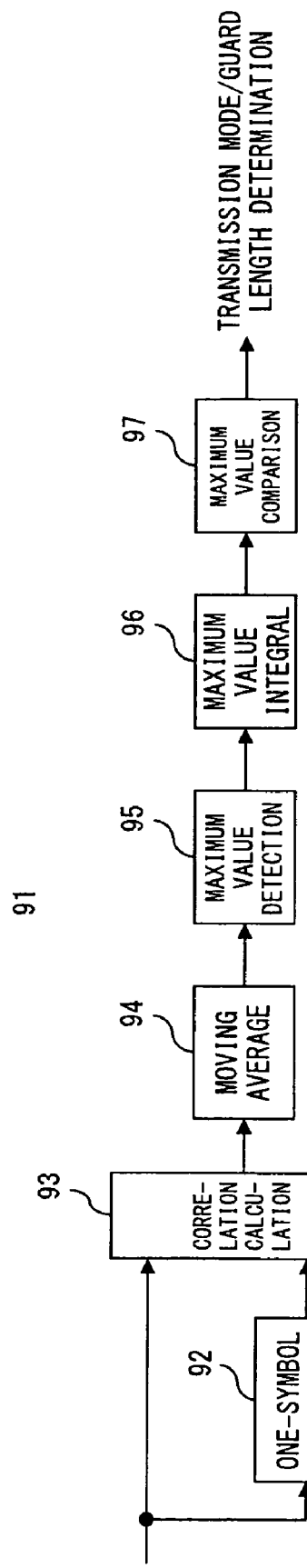
FIG. 2 shows a conventional mode/guard length detection circuit.
Figure 3:
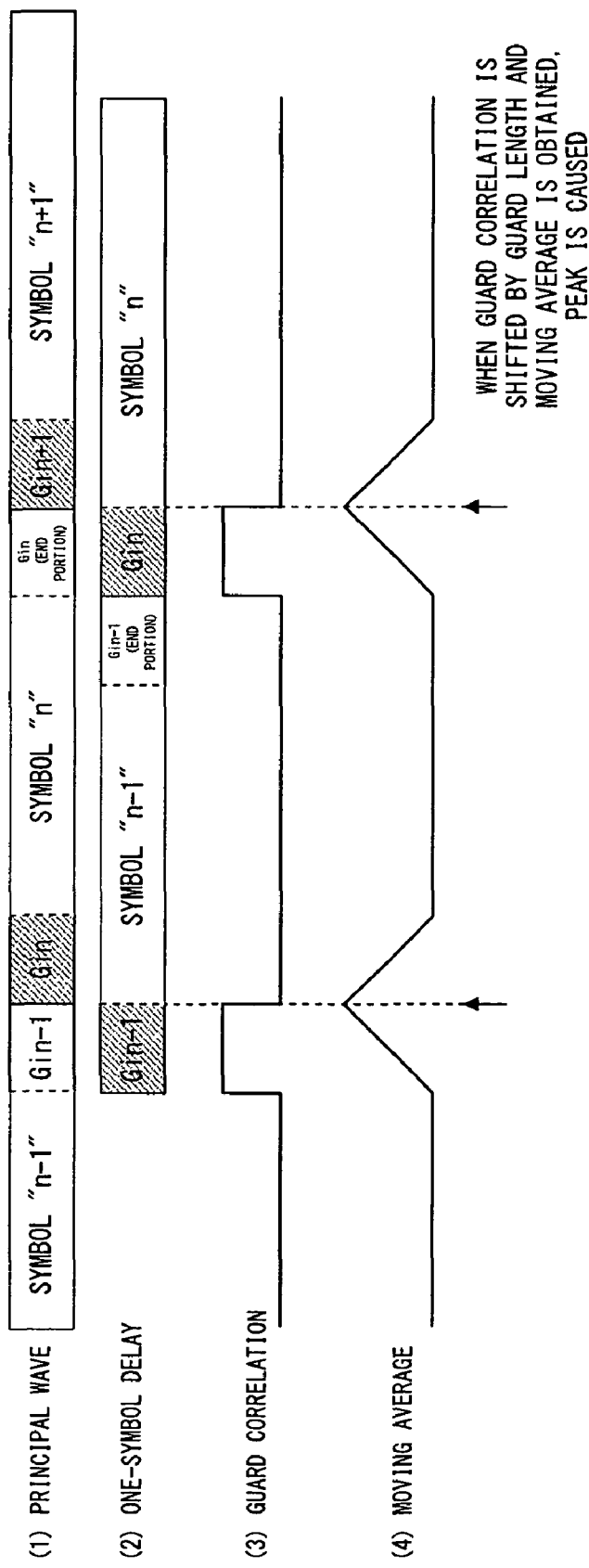
FIG. 3 is a timing chart for a conventional mode/guard length detection method.

Hereinafter, embodiments of the present invention will be explained in detail by referring to the drawings.

Figure 4:
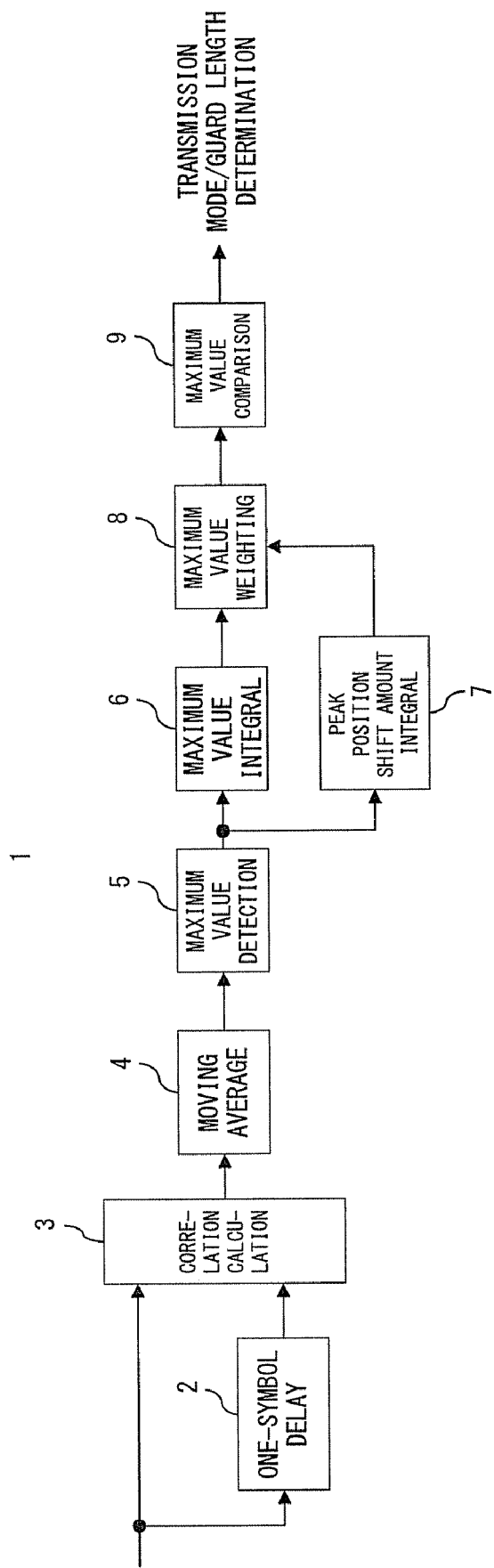
FIG. 4 shows a mode/guard length detection circuit and a method therefor according to the present invention.

FIG. 4 shows an example of the present invention. A transmission mode/guard length determination circuit 1 shown in FIG. 4 comprises a one-symbol delay circuit 2, a correlation calculation circuit 3, a moving average circuit 4, a maximum value detection circuit 5, a maximum value integral circuit 6, a peak-position shift-amount integral circuit 7, a maximum value weighting circuit 8, and a maximum value comparison circuit 9.

The transmission mode/guard length detection circuit 1 according to the present embodiment is provided in an OFDM signal demodulation device, and receives a signal that has been output from an OFDM signal modulation device or the like to a transmission line and has undergone signal processes such as filtering or the like. In the present example, transmission modes for the OFDM signals are explained on the basis of the ISDB-T standard. Although the ISDB-T standard is used for the explanation in the present example, the scope of the present invention is not limited to this.

Also, the reception signal that has been input into the OFDM signal demodulation device is converted into a base band signal, undergoes sampling by an A/D conversion unit, and becomes a digital baseband signal (I and Q).

The one-symbol delay circuit 2 performs the one-symbol delay process (except for the guard intervals) for delaying the real data (the symbols "n−1", "n", "n+1" and etc.) of the principal wave of the digital base band signal received in the above manner.

The correlation calculation circuit 3 performs a guard correlation process of correlating the real data (symbols "n−1", "n", and "n+1") in the principal wave with the data (except for the guard intervals) delayed by one symbol. The portions for the guard intervals have the same data, and a high correlation is obtained (guard correlation).

The moving average circuit 4 performs the moving average process of calculating the moving average on the correlation value of the correlation calculation circuit 3 for the guard length. Peaks are caused at boundary of the guard intervals and the real data.

Figure 5:
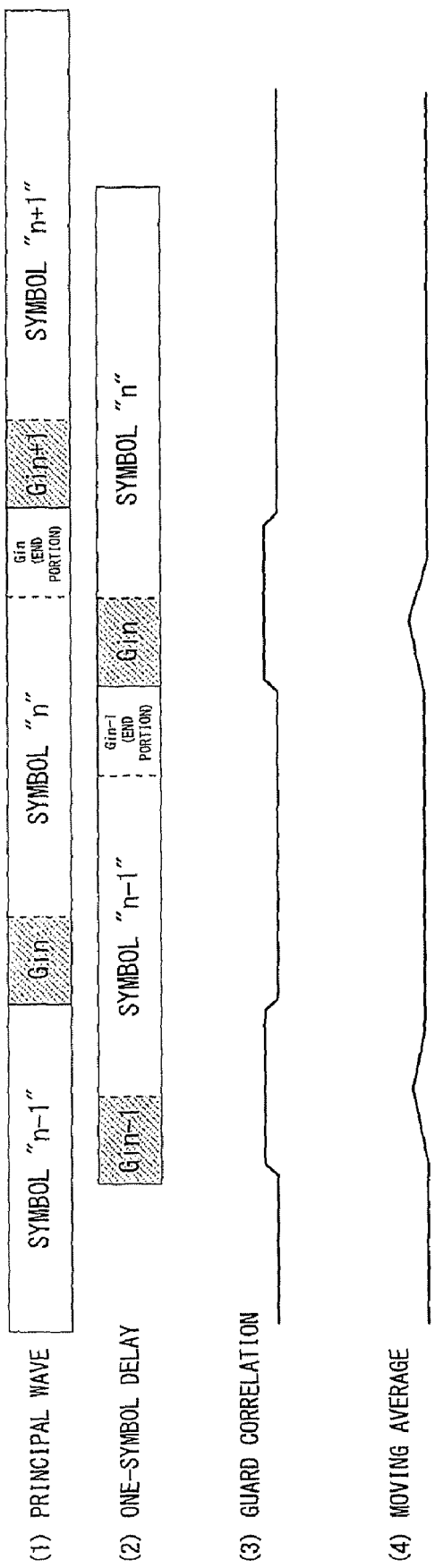
FIG. 5 is a timing chart of an output of a moving average process and outputs of respective circuits.

FIG. 5 shows an example in which data is broadcast with a guard length of ⅛ at mode 3, and the broadcast data is received with the setting of the guard length of ⅛ at mode 2. It is defined that the length for one symbol at mode 2 is 0.504 ms, and the length for one symbol at mode 3 is 1.008 ms.

When attention is paid to the symbol "n" in "(1) principal wave", the guard interval Gin of the symbol "n" is delayed by one symbol by the one-symbol delay circuit 2 on the basis of the setting of mode 2 and a guard length of ⅛. Accordingly, as shown in "(3) guard correlation", the correlation between the signal of the principal wave (mode 3 and guard length of ⅛) and "(2) one-symbol delay" can almost not be obtained at all. The signal components at the end portion of the symbol "n" of "(1) principal wave" and the guard interval Gin of the symbol "n" in "(2) one-symbol delay" are not at the same timing. Accordingly, only an output having low peaks can be obtained as shown as "(3) guard correlation". As a result of this, even when the moving average calculation is performed in (4) the moving average circuit 4, the value is still low.

Figure 6:
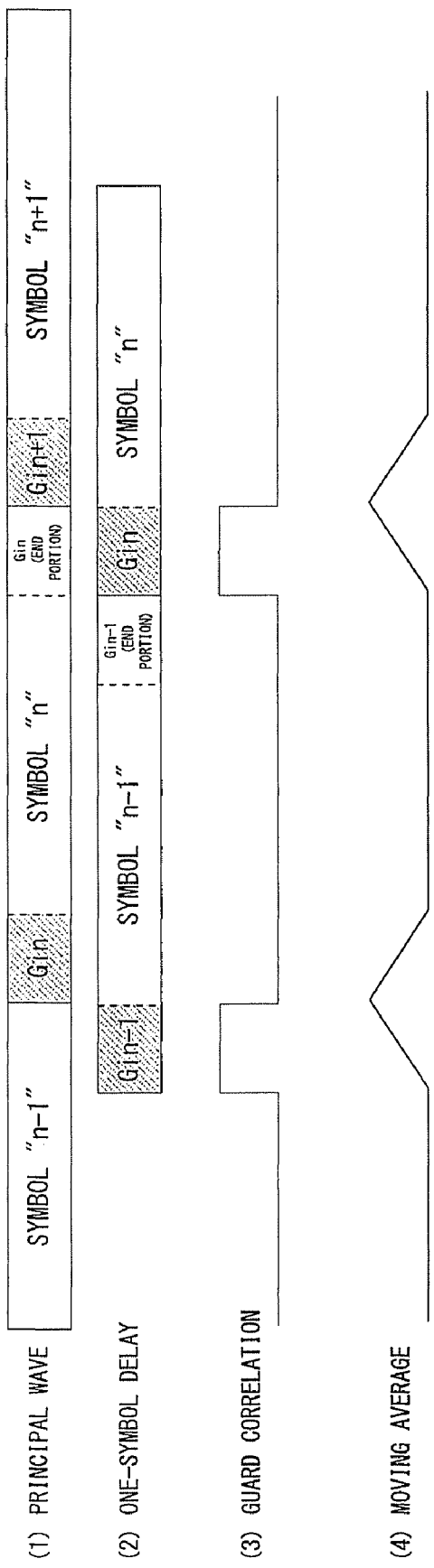
FIG. 6 is another timing chart of an output of a moving average process and outputs of respective circuits.

FIG. 6 shows an example in which data broadcast with the guard length of ⅛ at mode 3 is received with the setting of the guard length of ¼ at mode 3. When attention is paid to the symbol "n" of "(1) principal wave", the guard interval Gin of the symbol "n" is delayed by one symbol due to the setting of a guard length of ¼ at mode 3 by the one-symbol delay circuit 2. Accordingly, as shown by "(3) guard correlation", the signal component (same as the guard interval Gin) at the end portion of the symbol "n" (guard length of ⅛ at mode 3) of "(1) principal wave" and the guard interval Gin of the symbol "n" of "(2) one-symbol delay" have different timings. Because of this, the peak becomes smaller due to a prolonged period for obtaining the average, even though a peak can be obtained as shown in "(3) guard correlation". As a result of this, even when (4) the moving average circuit 4 is used for the moving average calculation, the value becomes lower than in the case when data is received with the correct guard length and at the correct mode.

Thus, the peak value as the maximum value of the signal output from the moving average circuit 4 is detected by the maximum value detection circuit 5 (maximum value detection process), and, by using "the maximum value integral circuit 6," a route for inputting into the maximum value weighting circuit 8 the peak integral value obtained by integrating the peak values of the maximum value detection circuit 5 for several symbols (maximum value integral process) and a route inputting the signal output from the moving average circuit 4 to the peak-position-shift-amount integral circuit 7 and the maximum value weighting circuit 8 are provided.

The peak-position shift-amount integral circuit 7 calculates the shift amount by calculating the difference between a periodical reference wave and the peak value interval of the output of the maximum value detection circuit (peak position shift amount integral process). The above reference value is generated on the basis of the transmission mode length that is the predetermined time length and the guard length that is the time length of the guard interval. In other words, when the moving average circuit 4 performs the calculation by using the combination of the correct transmission mode and guard length, the positions of the peaks will have an interval of "one symbol+guard length". When a combination of wrong transmission mode and guard length is used for the calculation, the shift between the position of the peak and "one symbol+guard length" becomes greater. The shift amounts from the positions of peaks are integrated and output.

Figure 7:
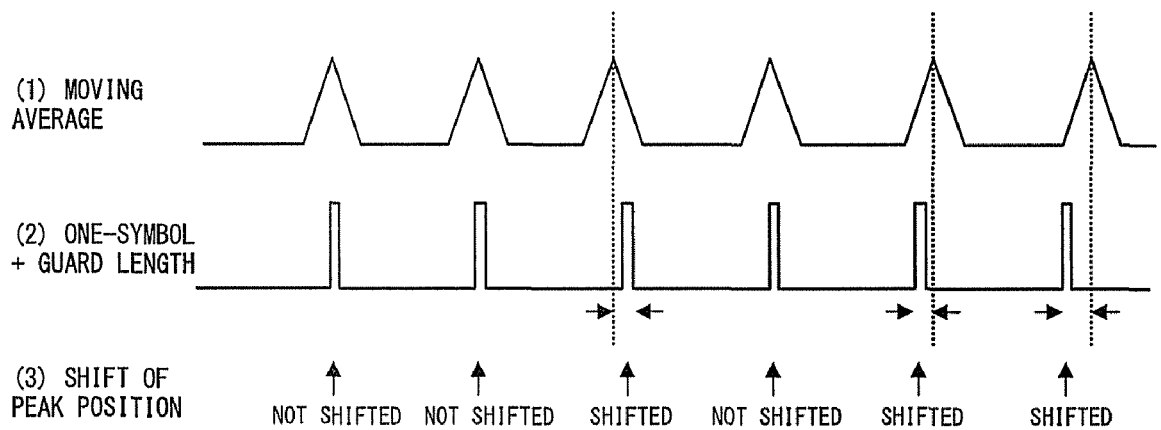
FIG. 7 shows a shift between a shift amount integral value in the wrong transmission mode and guard length and the reference value of the right "one symbol+guard length"

FIG. 7 shows the shift amounts from the peak positions on the signal output from the moving average circuit 4 and "One symbol+guard length". "(1) moving average" shows the peaks of waveform. "(2) one symbol+guard length" is a waveform that explains the reference of "one symbol+guard length" generated by the setting of mode and guard. The period of this waveform is constant for each setting. Symbol (3) denotes the shift amounts between the peaks of the output from the moving average circuit 4 and the constant period of "(2) one symbol+guard length". If the combination of the correct transmission and guard length is used, the shifts would not be caused as indicated by the arrows with the expression of "not shifted" in "(3)". If the combination is wrong, the shifts are caused as indicated by the arrows with the expression of "shifted".

FIG. 8 shows a case in which a broadcast wave with a guard length of ¼ at mode 3 is operated with a setting of the guard length of ⅛ at mode 3. Symbol "(1)" denotes the peaks of the waveform of the moving average. "(2) one symbol+guard length" shows a waveform that represents the reference for "one symbol+guard length" generated by the mode/guard setting. The period of this waveform is constant for each setting. The combination of the right transmission mode and guard length would cause only a small amount of shift. However, the wrong combination is actually used for obtaining the moving average. Accordingly, although a sharp peak is not caused, the shift amount increases more and more as shown in FIG. 8 because the guard length of "¼" is mistaken to be the guard length of "⅛".

The maximum value weighting circuit 8 performs a process of lowering the reliability of the peak of the signal output from the moving average circuit 4 along with the setting of the right mode and guard length on the basis of the shift amount from the peak position calculated by the peak-position shift-amount integral circuit 7 (maximum value weighting process).

The maximum value weighting method shown in FIG. 9 will be explained. A threshold value is provided beforehand for the shift amount integral value output from the peak-position shift-amount integral circuit 7. For example, the range of the peak maximum value is divided into four, and the weighing is performed on the peak maximum values on the basis of which of the threshold values shown in FIG. 9 the shift amount integral value corresponds to. When the shift amount of the shift amount integral value is small, the output (peak maximum value) of the maximum value integral circuit 6 is used as it is. Also, when the shift amount of the shift amount integral value is between the threshold values 2 and 3, the peak maximum value is set to ½ of the original value. When the shift amount of the shift amount integral value is between the threshold values 4 and 3, the peak maximum value is set to ¼ of the original value. When the shift amount is too large, the output (peak maximum value) of the maximum value integral circuit 6 is set to zero. In other words, the combination of the transmission mode and guard length is determined to be invalid.

It is noted that the range for the determination is divided into four portions in the present example; however, the scope of the present invention is not limited to this. For example, the range may be divided into a greater number in order to enhance the determination accuracy. Also, it is possible to set a range on the basis of actually measured values and also to set the range to be in a non-linear form, in addition to setting the range to be linear (to have a constant width).

For the above determination, a threshold value table is created and stored on a memory unit or the like in such a manner that the threshold values correspond to the shift amount integral values. Also, an algorithm for determining a range from the shift amount integral values may be used.

Thereby, even when the maximum value of the wrong combination becomes higher and the maximum value of the right combination becomes lower due to fading or the like, the reliability of the maximum value of the wrong combination is lowered in accordance with the shift amount. Accordingly, the right combination is selected in the end.

The maximum value comparison circuit 10 compares the predetermined threshold value with the signal output from the maximum value weighting circuit 8, and determines the combination of the transmission mode and guard length on the basis of the comparison result (maximum value comparison process).

Usually, a high peak cannot be caused unless the magnitude of this peak is integrated for several symbols, and the moving average of this guard correlation is obtained on the basis of the combination of the right transmission mode and guard length. Accordingly, the results of the combinations of all the transmission modes and guard lengths in the standard are compared, and the largest value of the combination of the transmission mode and guard length is determined to be the right value. On the basis of this determination result, the mode and the guard lengths are set correctly.

By using the above configuration, the device has a higher tolerance against variations in power such as fading or the like, and a normal determination is realized both in a normal situation and a fading situation by using the shift amount of a peak position in addition to the magnitude of the peaks as in the conventional methods. However, the shift amount of the positions of peaks in a situation with low power varies greatly regardless of presence or absence of the fading. Accordingly, the shift amount is used just as a reference, and the magnitude of the peak is mainly used.

Figure 10:
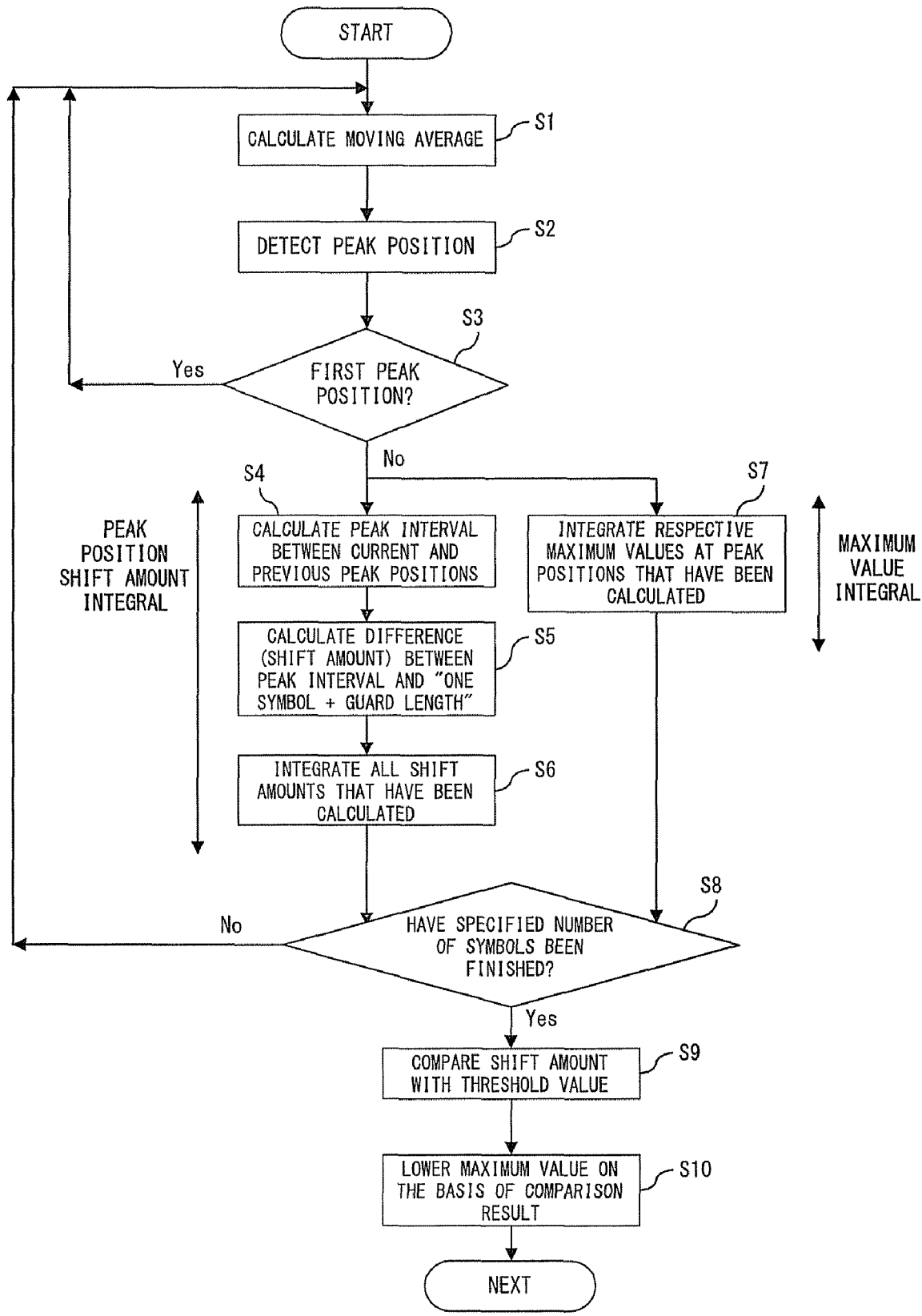
FIG. 10 is a flowchart for a maximum value weighting according to the present invention.

Next, the operations of the present invention will be explained by referring to FIG. 10.

In step S1, the moving average is calculated. Specifically, the real data of the principal wave of the digital baseband signal received is delayed by one symbol by the one-symbol delay process (except for the guard intervals).

Thereafter, by the correlation calculation process, the correlation of the real data of the principal wave and the data delayed by one symbol (except for the guard intervals) is obtained. The portions of the guard intervals have the same data, and accordingly a high correlation is obtained (guard correlation) As a result of this, peaks are caused at boundary of the guard intervals and the real data.

In step 2, the peak positions are detected. On the basis of the calculation results in step S1, the peak positions are calculated. For example, the sample-hold is performed for each symbol, and the maximum value is detected and held.

In step S3, it is determined whether or not the current position is the first peak position. When it is the first peak position (Yes), the process proceeds to step S1. Otherwise (No), the process proceeds to steps S4 and S7. When the moving average process is performed when the power is input or is performed by resetting, the intervals between the peaks cannot be obtained unless the first peak value is not obtained. Accordingly, the process proceeds to step S1 in order to obtain the next one symbol.

In step S4, the interval between the current peak and the peak of the previous symbol is calculated.

In step S5, the difference (shift amount) between the peak interval and "one symbol+guard length" is calculated. The difference between the interval (the ideal interval determined for each standard: reference value) of "one symbol+guard length" generated on the basis of the mode and guard setting and the peak interval (peak interval value) is calculated. For example, it is possible to count the number of samples and to handle the counted number as the shift amount between the reference value and the peak interval value.

In step S6, all the shift amounts that have been calculated are integrated. For example, the shift amounts for several symbols are integrated. Also, the shift amount integral value is reset for several symbols, and an integral is newly started.

In step S7, the respective peak values (maximum values) at the peak positions that have been calculated are integrated. For example, the peak values are integrated for several symbols. Also, the peak integral value is reset for several symbols, and an integral is newly started.

In step S8, it is determined whether or not the predetermined number of symbols has been finished. When the determination result is NO, the process proceeds to step S1. When the shift amount integral value and the peak integral value have been calculated for the prescribed number of symbols (i.e., the determination result is Yes), the process proceeds to step S9.

In step S9, the shift amount integral value and the threshold value are compared with each other. For this comparison, threshold values record in the threshold value table in memory as explained above, and a weighing coefficient is obtained from the threshold value table on the basis of the shift amount integral value. In step S10, the maximum value is made smaller on the basis of the comparison result in step S9. In other words, the peak integral value is changed by multiplying the weighting coefficient with the shift amount integral value.

By the above configuration, even when the maximum value is accidentally increased due to a wrong combination due to fading or the like and the maximum value of the right combination is decreased, the reliability of the maximum value of the wrong combination is lowered in accordance with the shift amount; accordingly, the right combination is selected in the end.

The configurations in the above examples may be realized by using a programmable device (an ASIC, a FPGA, a PLD or the like). Also, the above configuration may be operated by being read to a CPU or a DSP as software.

The scope of the present invention is not limited to the above embodiments, and various modifications and alterations are allowed without departing from the spirit of the present invention.

What is claimed is:

1. A transmission mode/guard length detection circuit for a radio device using the Orthogonal Frequency Division Multiplexing method, comprising:
    a one-symbol delay circuit delaying a received principal wave including a guard interval equal to an end portion of a symbol, by real data of the symbol;
    a guard correlation circuit calculating a correlation between the principal wave and an output of the one-symbol delay circuit;
    a moving average circuit taking a moving average of the outputs of the guard correlation circuit for predetermined symbols;
    a maximum value detection circuit detecting a peak value of the output of the moving average circuit for each of the symbols;
    a maximum value integral circuit integrating the outputs of the maximum value detection circuit for predetermined symbols;
    a guard maximum position shift amount integral circuit calculating a difference between a reference wave having a constant period and a peak value interval of the output of the maximum value detection circuit, said reference wave being generated on the basis of a transmission mode length that is a time period length of the predetermined symbol and a guard length that is a time period length of the guard interval, handling a resultant difference as a shift amount, integrating the shift amount for each of the symbols, and outputting a resultant value; and
    a maximum value weighting circuit changing the output of the maximum value integral circuit on the basis of the shift amount.

2. The transmission mode/guard length detection circuit for a radio device according to claim 1, wherein:
    the maximum value weighting circuit includes a table having a weighting coefficient corresponding to the shift amount, multiplies the weighting coefficient by the output of the maximum value integral circuit, and outputs a resultant value.

3. The transmission mode/guard length detection circuit for a radio device according to claim 1, further comprising at a stage subsequent to the maximum value weighting circuit:
    a maximum value comparison circuit comparing the output of the maximum value weighting circuit with a predetermined threshold value, and determining a combination of the transmission mode length and the guard length on the basis of a comparison result.

4. A transmission mode/guard length detection method for a radio device using the Orthogonal Frequency Division Multiplexing method, comprising:
    a one-symbol delay process in which a received principal wave including a guard interval equal to an end portion of a symbol is delayed by real data of the symbol;
    a guard correlation process in which a correlation between the principal wave and an output of the one-symbol delay process is calculated;
    a moving average process in which a moving average of the outputs of the guard correlation process for predetermined symbols is taken;
    a maximum value detection process in which a peak value of the output of the moving average process for each of the symbols is detected;
    a maximum value integral process in which the outputs of the maximum value detection process for predetermined symbols are integrated;
    a guard maximum position shift amount integral process in which a difference between a reference wave having a constant period and a peak value interval of the output of the maximum value detection process is calculated, said reference wave being generated on the basis of a transmission mode length that is a time period length of the predetermined symbol and a guard length that is a time period length of the guard interval, handling a resultant difference as a shift amount, integrating the shift amount for each of the symbols, and outputting a resultant value; and
    a maximum value weighting process of changing the output of the maximum value integral process on the basis of the shift amount.

5. The transmission mode/guard length detection method for a radio device according to claim 4, wherein:
    in the maximum value weighting process, a table having a weighting coefficient corresponding to the shift amount is used, the weighting coefficient is multiplied by the output of the maximum value integral process, and a resultant value is output.

6. The transmission mode/guard length detection method for a radio device according to claim 4, further comprising at a stage subsequent to the maximum value weighting process:
    a maximum value comparison process in which the output of the maximum value weighting process is compared with a predetermined threshold value, and a combination of the transmission mode length and the guard length is determined on the basis of a comparison result.

* * * * *